United States Patent
Naito et al.

(10) Patent No.: US 11,938,921 B2
(45) Date of Patent: Mar. 26, 2024

(54) VEHICLE CONTROL DEVICE

(71) Applicant: HONDA MOTOR CO., LTD., Tokyo (JP)

(72) Inventors: Yosuke Naito, Tokyo (JP); Masatoshi Saito, Tokyo (JP); Masashi Eto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 17/585,001

(22) Filed: Jan. 26, 2022

(65) Prior Publication Data

US 2022/0258722 A1 Aug. 18, 2022

(30) Foreign Application Priority Data

Feb. 12, 2021 (JP) .................. 2021-021000

(51) Int. Cl.
*B60W 20/19* (2016.01)
*B60W 10/06* (2006.01)
*B60W 10/08* (2006.01)
*B60K 6/442* (2007.10)

(52) U.S. Cl.
CPC ............ *B60W 20/19* (2016.01); *B60W 10/06* (2013.01); *B60W 10/08* (2013.01); *B60K 6/442* (2013.01); *B60W 2510/244* (2013.01); *B60W 2710/0644* (2013.01); *B60W 2720/10* (2013.01); *B60Y 2200/92* (2013.01)

(58) Field of Classification Search
CPC ...... B60W 20/19; B60W 20/15; B60W 10/06; B60W 10/08; B60W 10/26; B60W 2710/0644; B60W 50/0098; B60W 2520/10
See application file for complete search history.

(56) References Cited

U.S. PATENT DOCUMENTS

2013/0066495 A1* 3/2013 Furuta .................. B60W 20/13
 903/930
2020/0122712 A1 4/2020 Miki et al.
2021/0370923 A1* 12/2021 Cho ........................ B60K 6/442

FOREIGN PATENT DOCUMENTS

| JP | 2008-190407 A | | 8/2008 |
| JP | 2010-173389 A | | 8/2010 |
| JP | 2010173389 A | * | 8/2010 |
| JP | 2012144138 A | * | 8/2012 |
| WO | WO 2019/003443 A1 | | 1/2019 |

OTHER PUBLICATIONS

Sep. 27, 2022, Japanese Office Action issued for related JP Application No. 2021-021000.

* cited by examiner

*Primary Examiner* — George C Jin
(74) *Attorney, Agent, or Firm* — Paratus Law Group, PLLC

(57) ABSTRACT

A vehicle control device that controls a vehicle is configured to execute rotation speed control when the vehicle is in series traveling, in which a rotation speed of the internal combustion engine is increased to a first rotation speed in accordance with an increase in a speed of the vehicle, and when the rotation speed of the internal combustion engine reaches the first rotation speed, the rotation speed of the internal combustion engine is decreased to a second rotation speed lower than the first rotation speed; and restrict execution of the rotation speed control when receiving a predetermined operation.

4 Claims, 5 Drawing Sheets

FIG. 2

Ta

| TRAVELING MODE | FIRST CLUTCH | SECOND CLUTCH | ENGINE | MOTOR | GENERATOR |
|---|---|---|---|---|---|
| EV TRAVELING MODE | DISENGAGE | DISENGAGE | STOP POWER OUTPUT | HYBRID DRIVE | STOP POWER GENERATION |
| HYBRID TRAVELING MODE | DISENGAGE | DISENGAGE | OUTPUT POWER | GENERATOR DRIVE | GENERATE POWER |
| LOW-SPEED SIDE ENGINE TRAVELING MODE | ENGAGE | DISENGAGE | OUTPUT POWER | OUTPUT POWER AS NECESSARY | STOP POWER GENERATION |
| HIGH-SPEED SIDE ENGINE TRAVELING MODE | DISENGAGE | ENGAGE | OUTPUT POWER | OUTPUT POWER AS NECESSARY | STOP POWER GENERATION |

VEHICLE CONTROL DEVICE

CROSS-REFERENCE TO RELATED APPLICATIONS

This application is based on and claims priority under 35 USC 119 from Japanese Patent Application No. 2021-021000 filed on Feb. 12, 2021, the contents of which are incorporated herein by reference.

TECHNICAL FIELD

The present disclosure relates to a vehicle control device.

BACKGROUND ART

In a series type hybrid electric vehicle, a generator is driven by an internal combustion engine and an electric motor is driven by the generated electric power, thereby causing the vehicle to travel. For this reason, when power generation is required, if the internal combustion engine is operated steadily at an operating point at which the efficiency is highest, the fuel efficiency is improved. However, an operation sound of the internal combustion engine that is steadily operated does not change even if an operation of a driver on an accelerator pedal or a speed of the vehicle (that is, a vehicle speed) changes. In this regard, a driver who gets used to a vehicle including an internal combustion engine and a, transmission has a feeling of strangeness, and high marketability of the vehicle cannot be expected. For this reason, even for a series type hybrid electric vehicle, high marketability and a natural feeling for a driver are desired.

International publication No. WO2019/003443 (hereinafter, referred to as Patent Literature 1) discloses a technique in which a rotation speed of an internal combustion engine is increased or decreased between a lower-limit rotation speed and an upper-limit rotation speed in accordance with a change in a rotation speed of a drive wheel (that is, a vehicle speed). According to Patent Literature 1, it is possible to provide the driver with a natural feeling that the vehicle speed and an operation sound of the internal combustion engine are linked with each other as if the vehicle were a vehicle including an internal combustion engine and a transmission.

However, when a rotation speed of an internal combustion engine is increased or decreased in accordance with an increase in a speed of a vehicle, the marketability of the vehicle may be impaired. That is, when the rotation speed of the internal combustion engine is increased or decreased in accordance with an increase in the speed of the vehicle, a natural feeling that the speed of the vehicle and an operation sound of the internal combustion engine are linked with each other can be provided to a driver, but the acceleration performance of the vehicle may be lowered.

Therefore, for example, in a situation where the driver attaches importance to the acceleration performance of the vehicle, if the acceleration performance of the vehicle is lowered due to an increase or decrease of the rotation speed of the internal combustion engine in accordance with an increase in the speed of the vehicle, the marketability of the vehicle may be impaired.

The present disclosure provides a vehicle control device capable of appropriately executing rotation speed control for increasing or decreasing a rotation speed of an internal combustion engine in accordance with an increase in a speed of a vehicle, and capable of improving the marketability of the vehicle.

SUMMARY

The present disclosure provides a vehicle control device that controls a vehicle, the vehicle including an internal combustion engine, a generator capable of generating electric power by power output from the internal combustion engine, and an electric motor coupled to a drive wheel and capable of driving the drive wheel by being supplied with electric power from the generator, and the vehicle being capable of series traveling in which electric power from the generator is supplied to the electric motor and the electric motor drives the drive wheel to cause the vehicle to travel, in which the vehicle control device is configured to:

execute rotation speed control when the vehicle is in the series traveling, in which a rotation speed of the internal combustion engine is increased to a first rotation speed in accordance with an increase in a speed of the vehicle, and when the rotation speed of the internal combustion engine reaches the first rotation speed, the rotation speed of the internal combustion engine is decreased to a second rotation speed lower than the first rotation speed; and when a predetermined operation is received, restrict execution of the rotation speed control.

According to the present disclosure, it is possible to provide a vehicle control device capable of appropriately executing rotation speed control for increasing or decreasing a rotation speed of an internal combustion engine in accordance with an increase in a speed of a vehicle, and capable of improving the marketability of the vehicle.

BRIEF DESCRIPTION OF DRAWINGS

Exemplary embodiments of the present disclosure will be described in detail based on the following figures wherein:

FIG. 2 is a table illustrating contents of traveling modes;

DESCRIPTION OF EMBODIMENTS

Figure 1:
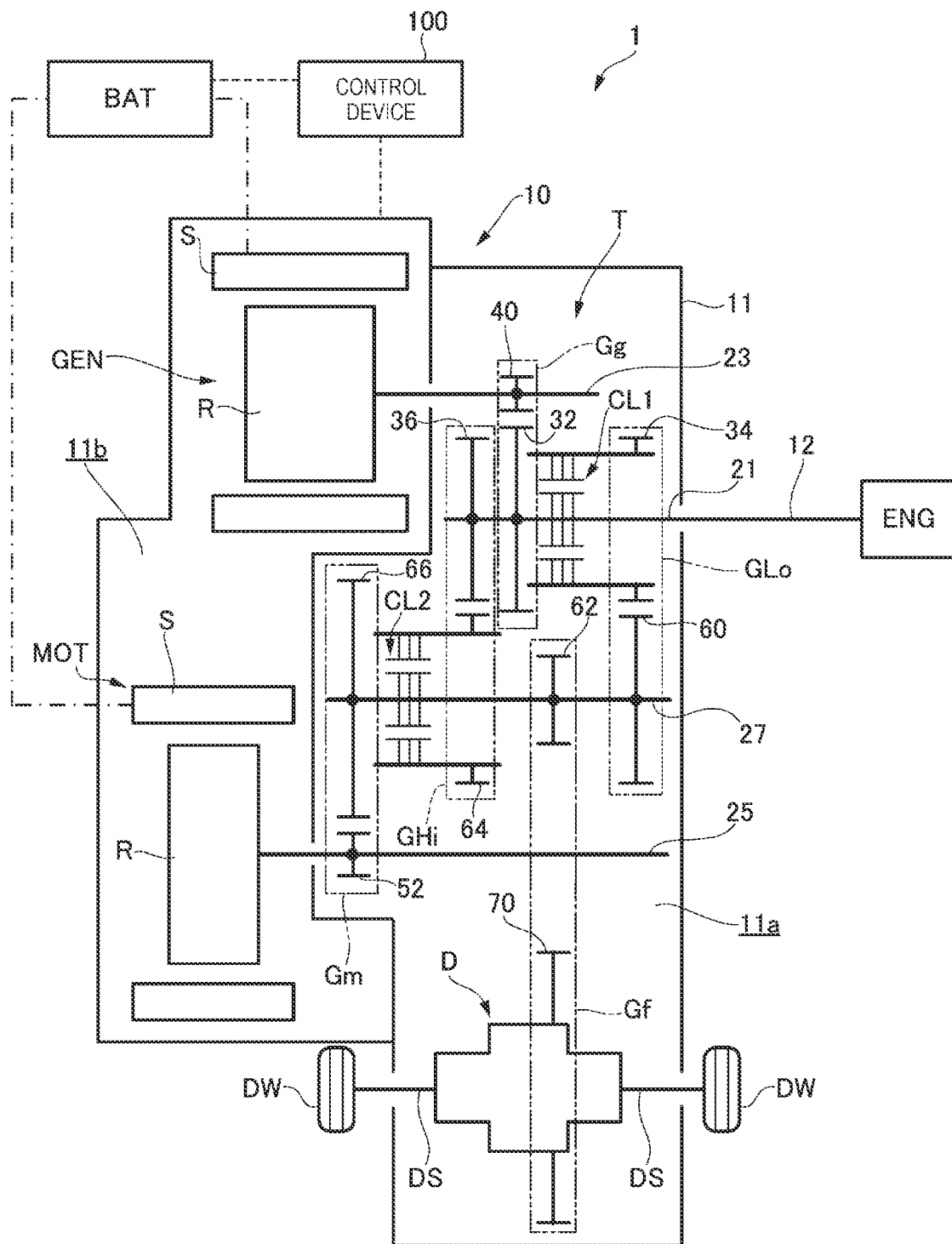
FIG. 1 is a diagram illustrating a schematic configuration of a vehicle including a control device according to an embodiment of the present disclosure.

Hereinafter, an embodiment of a vehicle control device according to the present disclosure will be described in detail with reference to the drawings, First, a vehicle 1 including a control device 100 according to an embodiment of a vehicle control device of the present disclosure will be described with reference to FIG. 1. As illustrated in FIG. 1, the vehicle 1 of the present embodiment includes a drive device 10 that outputs a driving force of the vehicle 1, and the control device 100 that performs control of the entire vehicle 1 including the drive device 10.

[Drive Device]

As illustrated in FIG. 1, the drive device 10 includes an engine ENG that is an example of an internal combustion engine according to the present disclosure, a generator GEN that is an example of a generator according to the present disclosure, a motor MOT that is an example of an electric motor according to the present disclosure, a transmission T, and a case 11 that accommodates the generator GEN the motor MOT, and the transmission T, The motor MOT and the generator GEN are connected to a battery BAT provided in the vehicle 1, and supply of electric power from the battery BAT and energy regeneration to the battery BAT are possible. The battery BAT is an example of a power storage device according to the present disclosure.

[Transmission]

The case 11 is provided with, from an engine ENG side along an axial direction, a transmission accommodation chamber 11a that accommodates the transmission T and a motor accommodation chamber 11b that accommodates the motor MOT and the generator GEN.

The transmission accommodation chamber 11a accommodates an input shaft 21, a generator shaft 23, a motor shaft 25, and a counter shaft 27, which are disposed parallel to one another, and a differential mechanism D.

The input shaft 21 is disposed side by side and coaxially with a crankshaft 12 of the engine ENG. A driving force of the crankshaft 12 is transmitted to the input shaft 21 via a damper (not shown). On the input shaft 21, a generator drive gear 32 constituting a generator gear train Gg is provided.

On the input shaft 21, a low-speed side drive gear 34 constituting a low-speed side engine gear train GLo is provided via a first clutch CL1 on an engine side with respect to the generator drive gear 32, and a high-speed side drive gear 36 constituting a high-speed side engine gear train GHi is provided on a side opposite to the engine side (hereinafter referred to as a motor side). The first clutch CL1 is a hydraulic clutch capable of engaging and disengaging the input shaft 21 with and from the low-speed side drive gear 34, and is a so-called multi-plate friction clutch.

The generator shaft 23 is provided with a generator driven gear 40 that meshes with the generator drive gear 32. The generator drive gear 32 of the input shaft 21 and the generator driven gear 40 of the generator shaft 23 constitute the generator gear train Gg for transmitting rotation of the input shaft 21 to the generator shaft 23, On the motor side of the generator shaft 23, the generator GEN is disposed. The generator GEN is configured to include a rotor R that is fixed to the generator shaft 23, and a stator S that is fixed to the case 11 and disposed on an outer diameter side of the rotor R so as to face the rotor R.

When the rotation of the input shaft 21 is transmitted to the generator shaft 23 via the generator gear train Gg, the rotor R of the generator GEN is rotated by the rotation of the generator shaft 23. Thus, at the time of driving of the engine ENG, power of the engine ENG input from the input shaft 21 can be converted into electric power by the generator GEN.

The motor shaft 25 is provided with a motor drive gear 52 constituting a motor gear train Gm. On the motor shaft 25, the motor MOT is disposed on the motor side with respect to the motor drive gear 52. The motor MOT includes a rotor R that is fixed to the motor shaft 25 and a stator S that is fixed to the case 11 and disposed on an outer diameter side of the rotor R so as to face the rotor R.

The counter shaft 27 is provided with, in an order from the engine side, a low-speed side driven gear 60 that meshes with the low-speed side drive gear 34, an output gear 62 that meshes with a ring gear 70 of the differential mechanism D a high-speed side driven gear 64 that meshes with the high-speed side drive gear 36 of the input shaft 21 via a second clutch CL2, and a motor driven gear 66 that meshes with the motor drive gear 52 of the motor shaft 25. The second clutch CL2 is a hydraulic clutch capable of engaging and disengaging the counter shaft 27 with and from the high-speed side driven gear 64, and is a so-called multi-plate friction clutch.

The low-speed side drive gear 34 of the input shaft 21 and the low-speed side driven gear 60 of the counter shaft 27 constitute the low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute the high-speed side engine gear train GHi for transmitting the rotation of the input shaft 21 to the counter shaft 27. Here, the low-speed side engine gear train GLo including the low-speed side drive gear 34 and the low-speed side driven gear 60 has a larger reduction ratio than the high-speed side engine gear train GHi including the high-speed side drive gear 36 and the high-speed side driven gear 64.

Accordingly, when the first clutch CL1 is engaged and the second clutch CL2 is disengaged at the time of driving of the engine ENG, a driving force of the engine ENG is transmitted to the counter shaft 27 via the low-speed side engine gear train GLo at a large reduction ratio. On the other hand, when the first clutch CL1 is disengaged and the second clutch CL2 is engaged at the time of driving of the engine ENG, the driving force of the engine ENG is transmitted to the counter shaft 27 via the high-speed side engine gear train GHi at a small reduction ratio. Note that there is no occurrence that the first clutch CL1 and the second clutch CL2 are engaged at the same time.

The motor drive gear 52 of the motor shaft 25 and the motor driven gear 66 of the counter shaft 27 constitute the motor gear train Gm for transmitting rotation of the motor shaft 25 to the counter shaft 27. When the rotor R of the motor MOT is rotated, the rotation of the motor shaft 25 is transmitted to the counter shaft 27 via the motor gear train Gm. Accordingly, at the time of driving of the motor MOT, a driving force of the motor MOT is transmitted to the counter shaft 27 via the motor gear train Gm, The output gear 62 of the counter shaft 27 and the ring gear 70 of the differential mechanism D constitute a final gear train Gf for transmitting rotation of the counter shaft 27 to the differential mechanism D. Accordingly, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for causing the vehicle 1 to travel is output via a pair of drive wheels DW provided at both ends of the axle DS.

The drive device 10 configured as described above has a power transmission path for transmitting the driving force of the motor MOT to the axle DS (that is, the drive wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the drive device 10 can take a plurality of traveling modes such as an EV traveling mode or a hybrid traveling mode in which the vehicle travels by power output from the motor MOT, and a low-speed side engine traveling mode or a high-speed side engine traveling mode in which the vehicle travels by power output from the engine ENG.

The control device 100 acquires vehicle information related to the vehicle 1 based on detection signals received from various sensors provided in the vehicle 1, and controls the drive device 10 based on the acquired vehicle information. Examples of the sensors provided in the vehicle 1 include a vehicle speed sensor that detects a rotation speed of the axle DS, an accelerator position sensor (hereinafter, also referred to as an AP sensor) that detects an operation amount with respect to an accelerator pedal of the vehicle 1, a brake sensor that detects an operation amount with respect to a brake pedal of the vehicle 1, an engine rotation speed sensor that detects a rotation speed of the engine ENG (hereinafter, also referred to as an engine rotation speed), and a battery sensor that detects a state of the battery BAT(for example, a voltage between terminals, a charging/discharging current, and a temperature of the battery BAT).

The vehicle information includes information indicating a traveling state of the vehicle 1. Examples of the traveling state of the vehicle 1 include a speed of the vehicle 1 (hereinafter, also referred to as a vehicle speed), an AP opening degree indicating an operation amount with respect to the accelerator pedal provided in the vehicle 1 (that is, an accelerator position), a driving force required for traveling of the vehicle 1 (hereinafter, also referred to as a required driving force), and an engine rotation speed.

The vehicle speed can be acquired based on a detection signal from the vehicle speed sensor. The AP opening degree can be acquired based on a detection signal from the AP sensor. The engine rotation speed can be acquired based on a detection signal from the engine rotation speed sensor. The required driving force can be derived based on the vehicle speed, the AP opening degree, or the like.

The vehicle information further includes battery information related to the battery BAT provided in the vehicle 1. The battery information includes information indicating a state of charge (SOC) that is a remaining capacity of the battery BAT, The SOC of the battery BAT is hereinafter also referred to as a battery SOC. The batter SOC can be derived based on a detection signal (for example, a voltage between terminals or a charging/discharging current of the battery BAT) from the battery sensor. In addition, the battery information may include information such as a voltage between terminals, a charging/discharging current, and a temperature of the battery BAT detected by the battery sensor.

The control device 100 controls the drive device 10 based on the vehicle information (that is, the traveling state of the vehicle 1 and the battery information) to cause the vehicle 1 to travel in any one of the plurality of traveling modes (to be described later) that the vehicle 1 can take. In controlling the drive device 10, for example, the control device 100 controls the driving of the engine ENG by controlling supply of fuel to the engine ENG, controls the driving of the motor MOT by controlling supply of electric power from the generator GEN or the battery BAT to the motor MOT, and controls power generation of the generator GEN by controlling a field current or the like flowing through coils of the generator GEN.

Further, in controlling the drive device 10, the control device 100 controls an actuator (not shown), which operates the first clutch CL1, to engage or disengage the first clutch CL1. Similarly, the control device 100 controls an actuator (not shown), which operates the second clutch CL2, to engage or disengage the second clutch CL2.

In this way, the control device 100 controls the engine ENG, the generator GEN, the motor MOT, the first clutch CL1, and the second clutch CL2, thereby enabling the vehicle 1 to travel in any one of the plurality of traveling modes to be described later. Note that the control device 100 is implemented with, for example, an electronic control unit (ECU) that includes a processor, a memory, an interface, and the like.

[Traveling Modes that Vehicle can Take]

Next, traveling modes that can be taken by the vehicle 1 will be described with reference to a traveling mode table Ta illustrated in FIG. 2. As illustrated in FIG. 2, the vehicle 1 can take an EV traveling mode, a hybrid traveling mode, a low-speed side engine traveling mode, and a high-speed side engine traveling mode.

[EV Traveling Mode]

The EV traveling mode is a traveling mode in which electric power is supplied from the battery BAT to the motor MOT and the vehicle 1 is caused to travel by power output from the motor MOT based on the electric power.

Specifically, in the case of the EV traveling mode, the control device 100 disengages both the first clutch CL1 and the second clutch CL2. In addition, in the case of the EV traveling mode, the control device 100 stops fuel injection to the engine ENG to stop output of power from the engine ENG. Further, in the case of the EV traveling mode, the control device 100 supplies electric power from the battery BAT to the motor MOT, and causes the motor MOT to output power corresponding to the electric power (illustrated as "battery drive" of motor), Thus, in the EV traveling mode, the vehicle 1 travels by the power output from the motor MOT based on the electric power supplied from the battery BAT.

In the EV traveling mode, as described above, the output of the power from the engine ENG is stopped, and both the first clutch CL1 and the second clutch CL2 are disengaged. Accordingly, in the EV traveling mode, power is not input to the generator GEN, and power generation by the generator GEN is not performed (illustrated as "stop power generation" of generator).

[Hybrid Traveling Mode]

The hybrid traveling mode is a traveling mode in which electric power is supplied from at least the generator GEN to the motor MOT, and the vehicle 1 is caused to travel by power output from the motor MOT based on the electric power. The hybrid traveling mode is an example of series traveling.

Specifically, in the case of the hybrid traveling mode, the control device 100 disengages both the first clutch CL1 and the second clutch CL2. In addition, in the case of the hybrid traveling mode, the control device 100 performs fuel injection to the engine ENG to output power from the engine ENG, The power output from the engine ENG is input to the generator GEN via the generator gear train Gg. Accordingly, power generation by the generator GEN is performed.

Further, in the case of the hybrid traveling mode, the control device 100 supplies electric power generated by the generator GEN to the motor MOT, and causes the motor MOT to output power corresponding to the electric power (illustrated as "generator drive" of motor). The electric power supplied from the generator GEN to the motor MOT is larger than the electric power supplied from the battery BAT to the motor MOT. Accordingly, in the hybrid traveling mode, the power output from the motor MOT (the driving force of the motor MOT) can be increased as compared with that in the EV traveling mode, and a large driving force can be obtained as the driving force of the vehicle 1.

In the case of the hybrid traveling mode, the control device 100 can also supply the electric power from the battery BAT to the motor MOT as necessary. That is, the control device 100 can supply electric power to the motor MOT from both the generator GEN and the battery BAT in the hybrid traveling mode. Accordingly, since the electric power supplied to the motor MOT can be increased as compared with that in the case where the electric power is supplied to the motor MOT only by the generator GEN, the power output from the motor MOT can be further increased, and a larger driving force can be obtained as the driving force of the vehicle 1.

In a speed range from 0 (zero) to a predetermined speed of the vehicle, the hybrid traveling mode is a traveling mode in which the largest driving force can be obtained as the driving force of the vehicle 1 among the traveling modes that the vehicle 1 can take. Accordingly, for example, in a situation where the stopped vehicle 1 is to be started and quickly accelerated, the control device 100 causes the vehicle 1 to travel in the hybrid traveling mode from the viewpoint of securing the acceleration performance of the vehicle 1.

[Low-Speed Side Engine Traveling Mode]

The low-speed side engine traveling mode is a traveling mode in which the vehicle 1 is caused to travel by transmitting power output from the engine ENG to the drive wheels DW is through the low-speed side power transmission path.

Specifically, in the case of the low-speed side engine traveling mode, the control device 100 performs fuel injection to the engine ENG to output power from the engine ENG. In addition, in the case of the low-speed side engine traveling mode, the control device 100 engages the first clutch CL1 and disengages the second clutch CL2. Accordingly, in the low-speed side engine traveling mode, the power output from the engine ENG is transmitted to the drive wheels DW via the low-speed side engine gear train GLo, the final gear train Gf, and the differential mechanism D to cause the vehicle 1 to travel.

In addition, in the case of the low-speed side engine traveling mode, the power output from the engine ENG is also input to the generator GEN via the generator gear train Gg, but power generation by the generator GEN is controlled so as not to be performed. For example, in the low-speed side engine traveling mode, a switching element provided in an electric-power transmission path between the generator GEN and the battery BAT (for example, a switching element of an inverter device provided between the generator GEN and the battery BAT) is turned off, so that the power generation by the generator GEN is controlled so as not to be performed. Accordingly, in the low-speed side engine traveling mode, it is possible to reduce a loss caused by the generator GEN performing power generation, and to reduce an amount of heat generated by the generator GEN and the like. In addition, in the low-speed side engine traveling mode, when the vehicle 1 is braked, regenerative power generation may be performed by the motor MOT, and the battery BAT may be charged with the generated electric power.

In addition, in the case of the low-speed side engine traveling mode, the control device 100 can supply electric power from the battery BAT to the motor MOT as necessary. Accordingly, in the low-speed side engine traveling mode, the vehicle 1 can be caused to travel also using the power output from the motor MOT based on the electric power supplied from the battery BAT, and a larger driving force can be obtained as the driving force of the vehicle 1 as compared with that in a case where the vehicle 1 is caused to travel only by the power of the engine ENG.

[High-Speed Side Engine Traveling Mode]

The high-speed side engine traveling mode is a traveling mode in which the vehicle 1 is caused to travel by transmitting power output from the engine ENG to the drive wheels DW through the high-speed side power transmission path.

Specifically, in the case of the high-speed side engine traveling mode, the control device 100 performs fuel injection to the engine ENG to output power from the engine ENG. In addition, in the case of the high-speed side engine traveling mode, the control device 100 engages the second clutch CL2 and disengages the first clutch CL1. Accordingly, in the high-speed side engine traveling mode, the power output from the engine ENG is transmitted, to the drive wheels DW via the high-speed side engine gear train GHi, the final gear train Gf, and the differential mechanism D to cause the vehicle 1 to travel, In addition, in the case of the high-speed side engine traveling mode, the power output from the engine ENG is also input to the generator GEN via the generator gear train Gg, but power generation by the generator GEN is controlled so as not to be performed. Accordingly, in the high-speed side engine traveling mode, it is possible to reduce a loss caused by the generator GEN performing power generation, and to reduce an amount of heat generated by the generator GEN and the like. In addition, in the high-speed side engine traveling mode, when the vehicle 1 is braked, regenerative power generation may be performed by the motor MOT, and the battery BAT may be charged with the generated electric power.

In addition, in the high-speed side engine traveling mode, the control device 100 can supply electric power from the battery BAT to the motor MOT as necessary. Accordingly, in the high-speed side engine traveling mode, the vehicle 1 can be caused to travel also using the power output from the motor MOT based on the electric power supplied from the battery BAT, and a larger driving force can be obtained as the driving force of the vehicle 1 as compared with that in the case where the vehicle 1 is caused to travel only by the power of the engine ENG.

[Engine Rotation Speed in Hybrid Traveling Mode]

Figure 3:
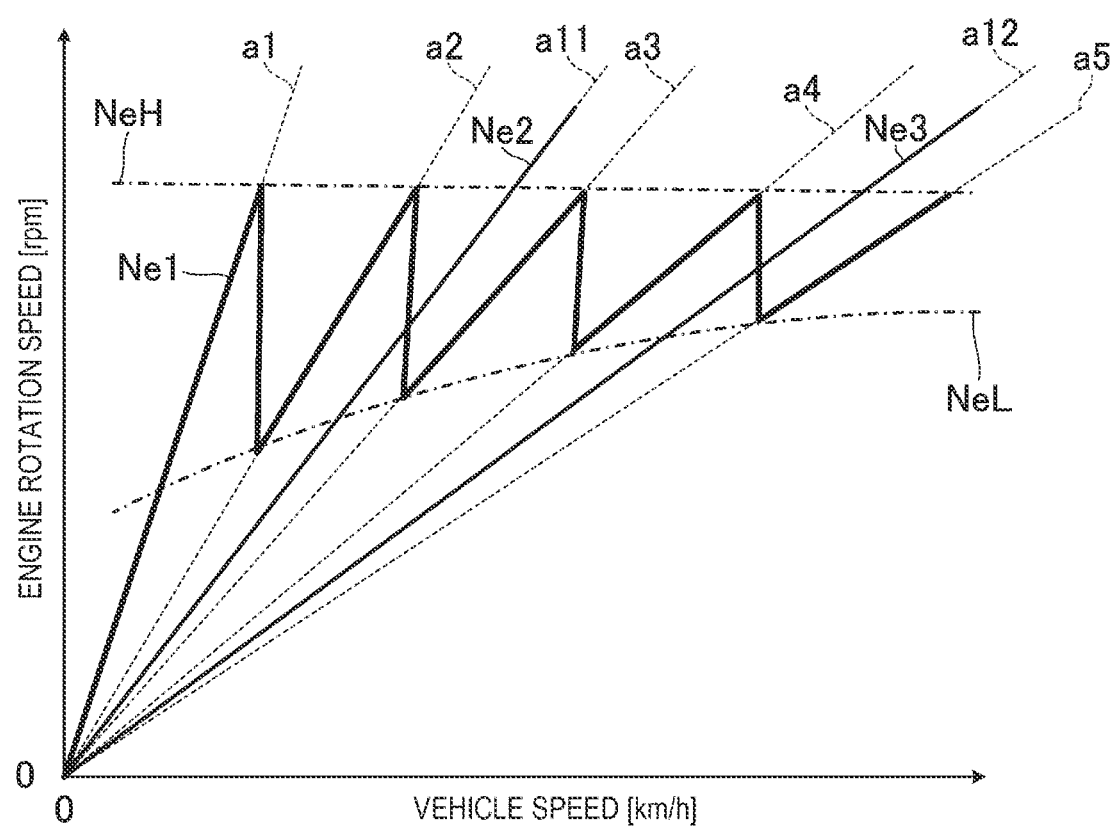
FIG. 3 is a graph illustrating an example of an engine rotation speed in a hybrid traveling mode.

Next, an engine rotation speed in the hybrid traveling mode will be described with reference to FIG. 3. In FIG. 3, a vertical axis indicates an engine rotation speed [rpm], and a horizontal axis indicates a vehicle speed [km/h].

An engine rotation speed Ne1 shown in FIG. 3 is an engine rotation speed in the hybrid traveling mode. As indicated by the engine rotation speed Ne1, in the case of the hybrid traveling mode, the control device 100 controls the engine rotation speed so as to vary between a predetermined upper-limit rotation speed NeH and a predetermined lower-limit rotation speed Net.

Specifically, in the case of the hybrid traveling mode, the control device 100 first increases the engine rotation speed at a predetermined increase rate a1 accompanying an increase in the vehicle speed from a state where both the vehicle speed and the engine rotation speed are 0 (zero). When the engine rotation speed reaches the upper-limit rotation speed NeH corresponding to the vehicle speed at that time, the engine rotation speed is reduced to a lower-limit rotation speed. Net, corresponding to the vehicle speed at that time, Thereafter, the control device 100 increases the engine rotation speed again from the lower-limit rotation speed Net, as the vehicle speed increases. However, at this time, the engine rotation speed is increased at an increase rate a2 smaller than the increase rate a1.

Thereafter, in the same manner, the control device 100 reduces the engine rotation speed to a corresponding lower-limit rotation speed NeL when the rotation speed reaches the upper-limit rotation speed NeH, and then increases the engine rotation speed at different increase rates of an increase rate a3, an increase rate a4, and an increase rate a5 separately as the vehicle speed increases. Here, the increase rate a2>the increase rate a3>the increase rate a4>the increase rate a5.

In the hybrid traveling mode, since both the first clutch CL1 and the second clutch CL2 are disengaged as described above, the engine rotation speed can be set arbitrarily regardless of the vehicle speed. However, by controlling the engine rotation speed so as to vary between the upper-limit rotation speed NeH and the lower-limit rotation speed NeL accompanying an increase in the vehicle speed in this way, it is possible to cause the driver to feel a natural change in an operation sound of the engine ENG that is linked with the vehicle speed as if a transmission shift is performed by a stepped transmission even during traveling in the hybrid traveling mode. The control for varying the engine rotation speed between the upper-limn rotation speed NeH and the lower-limit rotation speed NeL accompanying an increase in the vehicle speed is hereinafter also referred to as pseudo-shift rotation speed control.

An engine rotation speed Ne2 illustrated in FIG. 3 is an example of an engine rotation speed in the low-speed side engine traveling mode. As described above, in the low-speed side engine traveling mode, the engine ENG and the axle DS (that is, the drive wheels DW) are mechanically connected to each other. Therefore, as indicated by the engine rotation speed Ne2, the engine rotation speed and the vehicle speed linearly correspond to each other. Specifically, in the present embodiment, in the case of the low-speed side engine traveling mode, the engine rotation speed increases at an increase rate a11 as the vehicle speed increases. For example, here, the increase rate a2>the increase rate a11>the increase rate a3.

An engine rotation speed Ne3 illustrated in FIG. 3 is an example of an engine rotation speed in the high-speed side engine traveling mode. As described above, in the high-speed side engine traveling mode, the engine ENG and the axle DS are mechanically connected to each other as in the low-speed side engine traveling mode. Therefore, as indicated by the engine rotation speed Ne3, the engine rotation speed and the vehicle speed linearly correspond to each other. Specifically, in the present embodiment, in the high-speed side engine traveling mode, the engine rotation speed increases at an increase rate a12 as the vehicle speed increases. For example, here, the increase rate a4>the increase rate a12>the increase rate a5.

In FIG. 3, for the sake of convenience, the engine rotation speed Net and the engine rotation speed Ne3 in a state where the vehicle speed is 0 (zero) are also illustrated, but the low-speed side engine traveling mode and the high-speed side engine traveling mode may not be established at the time when the vehicle speed is 0 (zero).

[Execution Restriction of Pseudo-Shift Rotation Speed Control]

The control device 100 executes the pseudo-shill rotation speed control when the vehicle s traveling in the hybrid traveling mode, thereby allowing the driver to feel a natural change in the operation sound of the engine ENG that is linked with the vehicle speed as if a transmission shift is performed by a stepped transmission.

On the other hand, when the control device 100 executes the pseudo-shill rotation speed control, the engine rotation speed may decrease even at the time of increasing the vehicle speed (that is, at the time of acceleration of the vehicle 1) in the hybrid traveling mode. Further, when the engine rotation speed decreases, the electric power supplied from the generator GEN to the motor MOT decreases, which may lead to a decrease in the acceleration performance of the vehicle 1.

For example, in a situation where the vehicle 1 performs so-called sports traveling on a racing circuit or the like, importance is attached to the acceleration performance rather than to a natural change in the operation sound of the engine ENG. Therefore, in the situation where importance is attached to the acceleration performance of the vehicle 1 as described above, it is more preferable to suppress a decrease in the acceleration performance of the vehicle 1 than to provide a natural change in the operation sound of the engine ENG to the driver from the viewpoint of improving the marketability of the vehicle 1.

Therefore, when a predetermined operation is received, the control device 100 restricts the execution of the pseudo-shift rotation speed control. That is, the driver performs the predetermined operation on the vehicle 1 so that it is possible to avoid an occurrence that the pseudo-shift rotation speed control is executed against an intention of the driver. Therefore, the control device 100 can avoid the occurrence that the pseudo-shift rotation speed control is executed against the intention of the driver and can appropriately execute the pseudo-shift rotation speed control, and the marketability of the vehicle 1 of can be improved, Specifically, when the predetermined operation is received, the control device 100 activates launch control that increases the acceleration performance of the vehicle 1 (for example, exhibits the acceleration performance that the vehicle 1 originally has to the maximum) as compared with that in a normal state. Then, the control device 100 restricts the execution of the pseudo-shift rotation speed control during the activation of the launch control. That is, the control device 100 restricts the execution of the pseudo-shift rotation speed control when an operation for activating the launch control is received. Accordingly, the control device 100 can avoid the execution of the pseudo-shift rotation speed control that may lead to a decrease in the acceleration performance of the vehicle 1 in a situation where importance is attached to the acceleration performance of the vehicle 1, and can appropriately execute the pseudo-shift rotation speed control.

The operation for activating the launch control is, for example, an operation of strongly depressing the accelerator pedal so that the AP opening degree becomes equal to or greater than a predetermined launch control activation threshold (for example, see Th1 in FIG. 4) in a state where the brake pedal is depressed. The present disclosure is not limited thereto, and the control device 100 may receive the operation for activating the launch control (that is, an operation of restricting the execution of the pseudo-shift rotation speed control) via an operation part (for example, a predetermined operation button or an operation switch provided in the vehicle 1) different from the brake pedal or the accelerator pedal.

In addition, when a predetermined operation is received during the activation of the launch control, the control device 100 releases the launch control, and releases the restriction on the pseudo-shift rotation speed control accompanying the release of the launch control. Accordingly, in the normal state, the control device 100 can execute the pseudo-shift rotation speed control and allow the driver to feel a natural change in the operation sound of the engine ENG.

An operation of releasing the launch control is, for example, an operation of depressing the brake pedal in a state where the AP opening degree is equal to or less than a predetermined launch control release threshold (for example, see Th2 in FIG. 4), Similarly to the operation for activating the launch control, the control device 100 may receive the operation of releasing the launch control via an operation part different from the brake pedal or the accelerator pedal.

In the example described above, the control device 100 restricts the execution of the pseudo-shift rotation speed control when the operation for activating the launch control is received, but the present disclosure is not limited thereto. For example, the control device 100 may restrict the execution of the pseudo-shift rotation speed control when an operation for accelerating the vehicle 1 at an acceleration equal to or greater than a predetermined value is received. Even in this case, it is possible to avoid the execution of the pseudo-shift rotation speed control that may lead to a decrease in the acceleration performance of the vehicle 1 in a situation where importance is attached to the acceleration performance of the vehicle 1, and it is possible to appropriately execute the pseudo-shift rotation speed control. The operation for accelerating the vehicle 1 at an acceleration equal to or greater than a predetermined value may be, for example, an operation of strongly depressing the accelerator pedal so that the AP opening degree becomes equal to or greater than a predetermined threshold,

[Specific Control Example of Control Device]

Next, a specific control example of the control device 100 will be described with reference to FIG. 4. In the example illustrated in FIG. 4, a situation is mainly assumed where the stopped vehicle 1 is started and accelerated as quickly as possible until the vehicle 1 reaches a predetermined speed (for example, 100 km/h). In such a situation, in order to secure the acceleration performance of the vehicle 1, the hybrid traveling mode in which the largest driving force can be obtained in the above-described speed range is used as a traveling mode in which the vehicle 1 is caused to travel, and further the above-described launch control is used.

Figure 4:
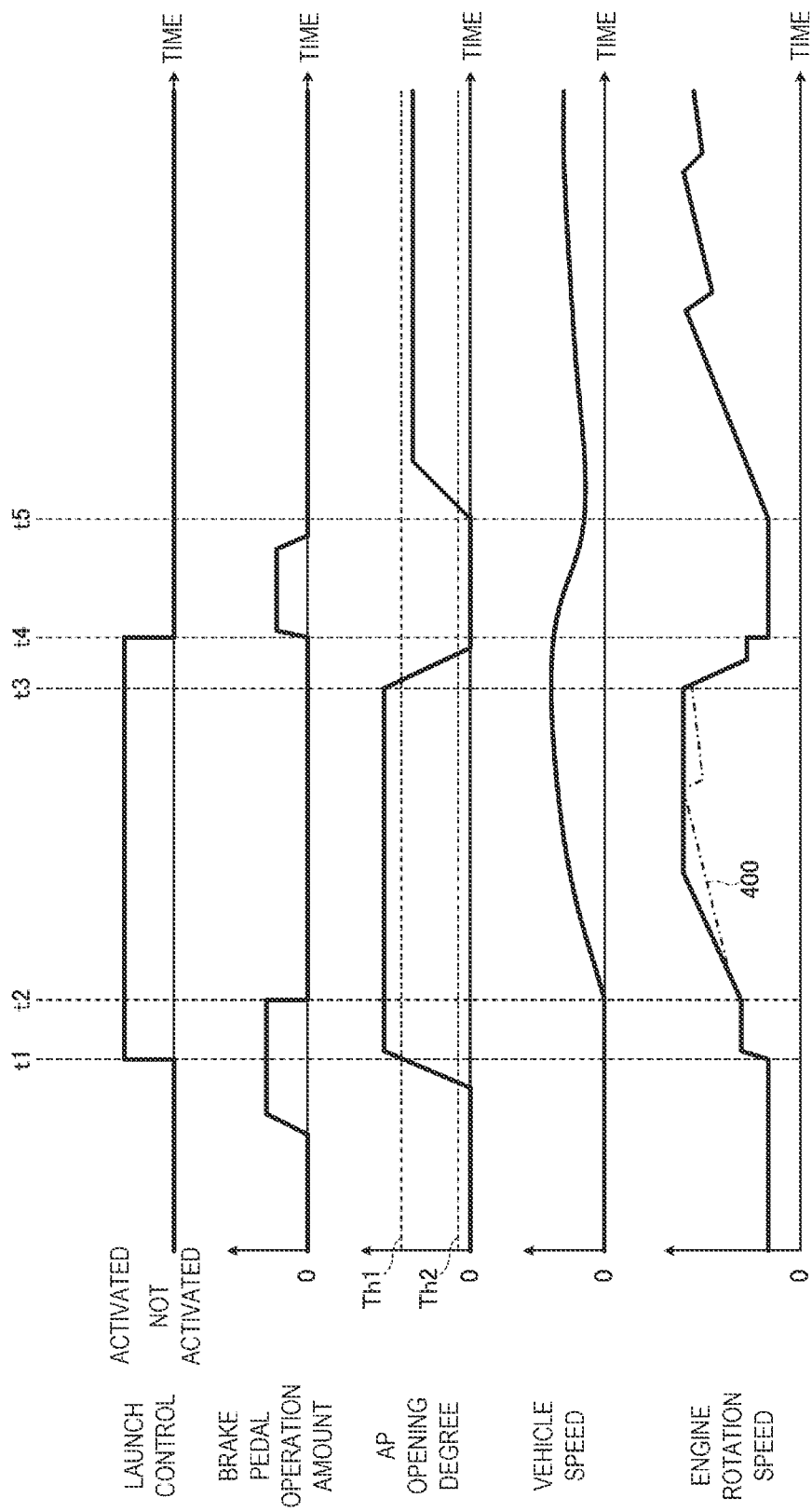
FIG. 4 is a timing chart illustrating a specific control example of the control device of the present embodiment.

As shown at a time-point 11 in FIG. 4, in a state where the vehicle 1 is stopped (that is, the vehicle speed is 0 (zero)), when the brake pedal is depressed and further the accelerator pedal is depressed so that the AP opening degree becomes equal to or greater than Th1 that is the launch control activation threshold, the control device 100 activates the launch control. Accordingly, the execution of the pseudo-shift rotation speed control is restricted from the time-point t1.

As illustrated in FIG. 4, when the launch control is activated, the control device 100 may perform control such that the lower-limit rotation speed of the engine rotation speed is higher than that in the normal state (when the launch control is not activated). Accordingly, a power generation amount of the generator GEN, that is, the electric power that can be supplied from the generator GEN to the motor MOT, can be increased, and the acceleration performance of the vehicle 1 can be improved.

When an operation on the brake pedal is released (that is, when an operation amount with respect to the brake pedal becomes 0) at a time-point t2 after the time-point t1, the control device 100 starts the vehicle 1 and accelerates the vehicle 1 as quickly as possible. At this time, since the execution of the pseudo-shift rotation speed control is restricted, the control device 100 increases the engine rotation speed to a predetermined rotation speed accompanying an increase in the vehicle speed, in order to secure electric power supplied to the motor MOT to enable the motor MOT to output power corresponding to the required driving force of the vehicle 1. That is, at this time, the engine rotation speed does not decrease in the middle. The predetermined rotation speed is, for example, a rotation speed at which the output from the engine ENG becomes maximum. Accordingly, the vehicle 1 can exhibit the acceleration performance that the vehicle 1 originally has to the maximum.

In FIG. 4, a one-dot chain line denoted by a reference sign 400 indicates an example of the engine rotation speed in a case where the execution of the pseudo-shift rotation speed control is not restricted, that is, in a case where the pseudo-shift rotation speed control is executed. As indicated by the engine rotation speed 400, in the case where the pseudo-shift rotation speed control is executed, the engine rotation speed may decrease between the time-point t2 and a time-point t3 when the vehicle speed is increasing. Therefore, in this case, the electric power supplied from the generator GEN to the motor MOT temporarily decreases at a timing when the engine rotation speed decreases, and the acceleration of the vehicle 1 may be held up.

Since the vehicle speed reaches the predetermined speed at the time-point t3 after the time-point t2, the driver releases an operation on the accelerator pedal (that is, sets the AP opening degree to 0). Accordingly, the AP opening degree becomes equal to or less than Th2, which is the launch control release threshold. Then, from a subsequent time-point t4, the driver depresses the brake pedal to decelerate the vehicle 1. In this way, when the brake pedal is depressed in a state where the AP opening degree is equal to or less than Th2 that is the launch control release threshold, the control device 100 releases the launch control. Accordingly, the restriction on the pseudo-shift rotation speed control is also released from the time-point t4.

Therefore, when the accelerator pedal is depressed by the driver to accelerate the vehicle 1 from a time-point t5 after the time-point t4, the control device 100 executes the pseudo-shift rotation speed control to increase or decrease the engine rotation speed accompanying an increase in the vehicle speed, Thus, at the time of acceleration from the time-point t5, it is possible to allow the driver to feel a natural change in the operation sound of the engine ENG that is linked with the vehicle speed as if a transmission shift is performed by a stepped transmission.

[Supply Control of Electric Power from Battery to Motor]

In the hybrid traveling mode, it is necessary to increase the output of the motor MOT in order to improve the acceleration performance of the vehicle 1. As a method of increasing the output of the motor MOT, a method of increasing the electric power supplied to the motor MOT is considered. The electric power supplied to the motor MOT is a sum of the electric power supplied from the generator GEN to the motor MOT and the electric power supplied from the battery BAT to the motor MOT. Therefore, when the electric power supplied from the generator GEN to the motor MOT reaches an upper limit, if the battery BAT can discharge electric power to the motor MOT at the maximum electric power that can be output from the battery BAT, the electric power supplied to the motor MOT can be maximized.

However, in general, there is an limit to a period in which the battery BAT can discharge electric power at the maximum electric power. Therefore, in order to maximize the electric power supplied to the motor MOT, it is necessary to appropriately control a timing of supplying the electric power from the battery BAT to the motor MOT. Therefore, from the viewpoint of improving the acceleration performance of the vehicle 1, the control device 100 preferably controls supply of the electric power from the battery BAT to the motor MOT as follows.

When the vehicle 1 is traveling in the hybrid traveling mode, the control device 100 derives required electric power for driving the motor MOT based on a traveling state of the vehicle 1. The required electric power is, for example, electric power required by the motor MOT in order for the motor MOT to output power corresponding to the required driving force of the vehicle 1.

Further, when the vehicle 1 is traveling in the hybrid traveling mode, the control device 100 restricts the supply of electric power from the battery BAT to the motor MOT based on the derived required electric power and electric power that can be supplied from the generator GEN to the motor MOT.

Specifically, when the required electric power is equal to or less than the electric power that can be supplied from the generator GEN to the motor MOT, that is, when the required electric power can be covered by only the electric power that can be supplied from the generator GEN to the motor MOT, the control device 100 restricts the supply of electric power from the battery BAT to the motor MOT. Accordingly, it is possible to suppress the battery BAT from discharging electric power when the required electric power is covered by only the electric power that can be supplied from the generator GEN to the motor MOT. Therefore, it is possible to avoid an occurrence that the battery BAT' discharges electric power to the motor MOT at the maximum electric power before the electric power supplied from the generator GEN to the motor MOT reaches the upper limit.

Further, when the required electric power exceeds the electric power that can be supplied from the generator GEN to the motor MOT, that is, when the required electric power cannot be covered only by the electric power that can be supplied from the generator GEN to the motor MOT, the control device 100 performs the supply of electric power from the battery BAT to the motor MOT. Accordingly, it is possible to secure the electric power for driving the motor MOT. In this way, the discharge of electric power by the battery BAT is started after the required electric power cannot be covered by only the electric power that can be supplied from the generator GEN to the motor MOT, so that it is possible to cause the battery BAT to discharge electric power to the motor MOT at the maximum electric power after the electric power supplied from the generator GEN to the motor MOT reaches the upper limit.

As described above, the control device 100 delays the timing, at which the supply of electric power from the battery BAT to the motor MOT is performed, until the required electric power cannot be covered only by the electric power that can be supplied from the generator GEN to the motor MOT, so that the electric power supplied to the motor MOT can be maximized and the acceleration performance of the vehicle 1 can be improved. Accordingly, for example, in a situation where the stopped vehicle 1 is to be started and accelerated as quickly as possible until the vehicle 1 reaches a predetermined speed, it is possible to maintain the acceleration performance of the vehicle 1 even in a later stage after lapse of a predetermined period since start of the vehicle 1.

Figure 5:
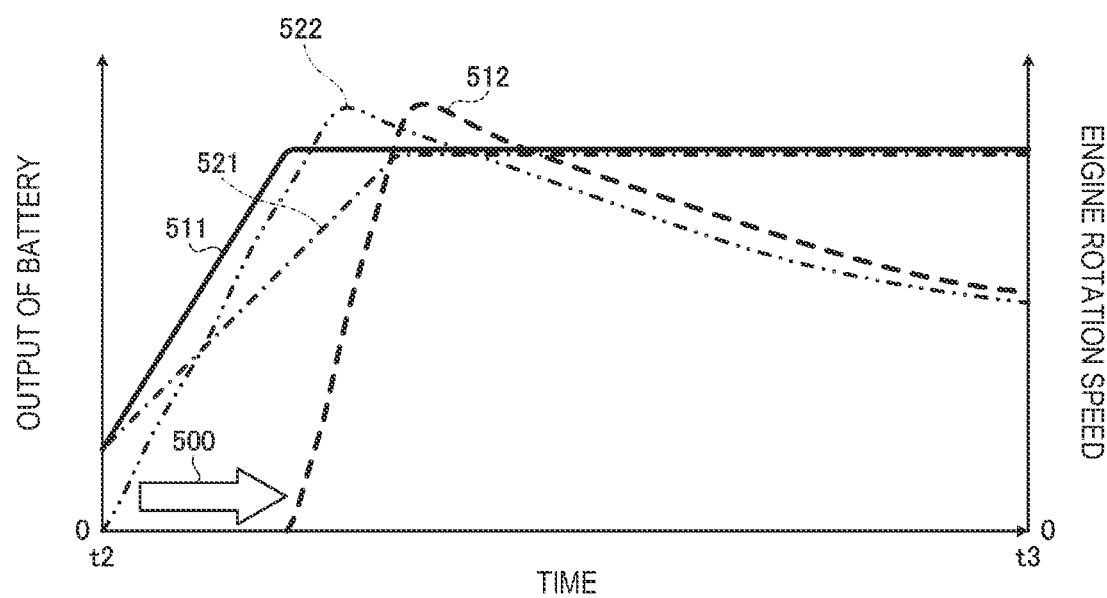
FIG. 5 is a graph illustrating an example of supply control of electric power from a battery to a motor by the control device according to the present embodiment.

Specifically describing an example of the supply of electric power from the battery BAT to the motor MOT, the control device 100 controls the engine rotation speed as indicated by a solid line denoted by a reference sign 511 in FIG. 5 and controls the output of the battery BAT (that is, the electric power supplied from the battery BAT to the motor MOT) as indicated by a broken line denoted by a reference sign 512 in FIG. 5, for example, in a period from the time-point t2 to the time-point t3 illustrated in FIG. 4.

As illustrated in FIG. 5, the control device 100 delays the timing (see a void arrow 500 in FIG. 5) at which the supply of electric power from the battery BAT to the motor MOT is performed, so that the battery BAT can supply the maximum electric power to the motor MOT after the engine rotation speed reaches the predetermined rotation speed (that is, after the electric power supplied from the generator GEN to the motor MOT reaches the upper limit).

On the other hand, it is assumed that the timing at which the supply of electric power from the battery BAT to the motor MOT is performed is not delayed, and for example, the engine rotation speed is controlled as indicated by a one-dot chain line denoted by a reference sign 521 in FIG. 5, and the output of the battery BAT is controlled as indicated by a two-dot chain line denoted by a reference sign 522 in FIG. 5. In this case, after the engine rotation speed reaches the predetermined rotation speed, the battery BAT cannot discharge electric power at the maximum electric power. Therefore, a maximum value of the electric power supplied to the motor MOT is smaller than that in the case where the timing at which the supply of electric power from the battery BAT to the motor MOT is performed is delayed as described above.

For example, the control device 100 delays the timing, at which the supply of electric power from the battery BAT to the motor MOT is performed, as described above only when the execution of the pseudo-shift rotation speed control is restricted. Accordingly, in a situation where importance is attached to the acceleration performance of the vehicle 1, the control device 100 can appropriately control the timing at which the supply of electric power from the battery BAT to the motor MOT is performed, and can improve the acceleration performance of the vehicle 1.

As described above, according to the control device 100 of the present embodiment, it is possible to appropriately execute the pseudo-shift rotation speed control of increasing or decreasing the engine rotation speed in accordance with an increase in the speed of the vehicle 1, and it is possible to improve the marketability of the vehicle 1.

The present disclosure is not limited to the embodiment described above, and modifications, improvements, or the like can be made as appropriate.

For example, in the above-described embodiment, the traveling modes (the low-speed side engine traveling mode and the high-speed side engine traveling mode) in which the power of the engine ENG is transmitted to the drive wheels DW to cause the vehicle 1 to travel are provided, but the vehicle 1 may not take these traveling modes. In addition, only one of the low-speed side engine traveling mode and the high-speed side engine traveling mode may be provided as the traveling mode in which the power of the engine ENG is transmitted to the drive wheels DW to cause the vehicle 1 to travel.

In the present specification, at least the following matters are described. Although corresponding components and the like in the above-described embodiment are shown in parentheses, the present disclosure is not limited thereto.

(1) A vehicle control device (control device 100) that controls a vehicle (vehicle 1), the vehicle including an internal combustion engine (engine ENG), a generator (generator GEN) capable of generating electric power by power output from the internal combustion engine, and an electric motor (motor MOT) coupled to a drive wheel (drive wheels DW) and capable of driving the drive wheel by being supplied with electric power from the generator, and the vehicle being capable of series traveling in which electric power from the generator is supplied to the electric motor and the electric motor drives the drive wheel to cause the vehicle to travel, in which the vehicle control device is configured to:
execute rotation speed control (pseudo-shift rotation speed control) when the vehicle is in the series traveling, in which a rotation speed of the internal combustion engine is increased to a first rotation speed (upper-limit rotation speed NeH) in accordance with an increase in a speed of the vehicle, and when the rotation speed of the internal combustion engine reaches the first rotation speed, the rotation speed of the internal combustion engine is decreased to a second rotation speed (lower-limit rotation speed NeL) lower than the first rotation speed; and
restrict execution of the rotation speed control when a predetermined operation is received, According to (1), when the predetermined operation is received, the execution of the rotation speed control for increasing or decreasing the rotation speed of the internal combustion engine in accordance with the increase in the speed of the vehicle is restricted, and thus it is possible to avoid an occurrence that the rotation speed control is executed against an intention of a driver. Therefore, it is possible to appropriately execute the rotation speed control, and it is possible to improve the marketability of the vehicle.

(2) The vehicle control device according to (1), in which the predetermined operation is an operation for activating launch control.

According to (2), it is possible to avoid execution of the rotation speed control that may lead to a decrease in the acceleration performance of the vehicle in a situation where importance is attached to the acceleration performance of the vehicle, and thus it is possible to appropriately execute the rotation speed control.

(3) The vehicle control device according to claim 1,
in which the predetermined operation is an operation for accelerating the vehicle at an acceleration equal to or greater than a predetermined value.

According to (3), it is possible to avoid execution of the rotation speed control that may lead to a decrease in the acceleration performance of the vehicle in a situation where importance is attached to the acceleration performance of the vehicle, and thus it is possible to appropriately execute the rotation speed control.

(4) The vehicle control device according to any one of (1) to (3), the vehicle further including a power storage device (battery BAT) capable of supplying electric power to the electric motor,
in which the vehicle control device is configured to:
derive required electric power for driving the electric motor based on a traveling state of the vehicle when the vehicle is in the series traveling,
control supply of electric power from the power storage device to the electric motor based on the derived required electric power and electric power that the generator is capable of supplying to the electric motor, and
when the required electric power is equal to or less than the electric power that the generator is capable of supplying to the electric motor, restrict supply of electric power from the power storage device to the electric motor.

According to (4), it is possible to suppress the power storage device from discharging electric power when the required electric power is covered only by the electric power generated by the generator.

(5) The vehicle control device according to (4), in which the vehicle control device is configured to supply electric power from the power storage device to the electric motor when the required electric power exceeds the electric power that the generator is capable of supplying to the electric motor.

According to (5), when the required electric power exceeds the electric power that the generator is capable of supplying to the electric motor, supply of electric power from the power storage device to the electric motor is performed so that the electric power for driving the electric motor can be secured.

(6) The vehicle control device according to (4) or (5), in which the vehicle control device is configured to restrict supply of electric power from the power storage device to the electric motor when execution of the rotation speed control is restricted and the required electric power is equal to or less than the electric power that the generator is capable of supplying to the electric motor.

According to (6), in a situation where importance is attached to the acceleration performance of the vehicle, a timing at which supply of electric power from the power storage device to the electric motor is performed is appropriately controlled, and the acceleration performance of the vehicle can be improved.

The invention claimed is:

1. A vehicle control device that controls a vehicle, the vehicle comprising an internal combustion engine, a generator capable of generating electric power by power output from the internal combustion engine, and an electric motor coupled to a drive wheel and capable of driving the drive wheel by being supplied with electric power from the generator, and the vehicle being capable of series traveling in which electric power from the generator is supplied to the electric motor and the electric motor drives the drive wheel to cause the vehicle to travel,
wherein the vehicle control device is configured to:
execute rotation speed control when the vehicle is in the series traveling, in which a rotation speed of the internal combustion engine is increased to a first rotation speed in accordance with an increase in a speed of the vehicle, and when the rotation speed of the internal combustion engine reaches the first rotation speed, the rotation speed of the internal combustion engine is decreased to a second rotation speed lower than the first rotation speed; and
restrict execution of the rotation speed control when receiving a predetermined operation, and
wherein the predetermined operation is an operation for activating launch control, or an operation for depressing an accelerator pedal such that an accelerator opening degree becomes equal to or greater than a predetermined value.

2. The vehicle control device according to claim 1, the vehicle further comprising a power storage device capable of supplying electric power to the electric motor,
wherein the vehicle control device is configured to:
derive required electric power for driving the electric motor based on a traveling state of the vehicle when the vehicle is in the series traveling;
control supply of electric power from the power storage device to the electric motor based on the derived required electric power and electric power that the generator is capable of supplying to the electric motor; and when the required electric power is equal to or less than the electric power that the generator is capable of supplying to the electric motor, restrict supply of electric power from the power storage device to the electric motor.

3. The vehicle control device according to claim 2, wherein the vehicle control device is configured to supply electric power from the power storage device to the electric motor when the required electric power exceeds the electric power that the generator is capable of supplying to the electric motor.

4. The vehicle control device according to claim 2, wherein the vehicle control device is configured to restrict supply of electric power from the power storage device to the electric motor when execution of the rotation speed control is restricted and the required electric power is equal to or less than the electric power that the generator is capable of supplying to the electric motor.

\* \* \* \* \*